United States Patent
Chen

(10) Patent No.: US 11,351,751 B2
(45) Date of Patent: Jun. 7, 2022

(54) NOISE-ABSORBENT AND ODOR-ADSORBENT FABRIC COVER SYSTEMS FOR VEHICLE INTERIORS

(71) Applicant: BOARD OF REGENTS, THE UNIVERSITY OF TEXAS SYSTEM, Austin, TX (US)

(72) Inventor: Jonathan Y. Chen, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 499 days.

(21) Appl. No.: 16/339,600

(22) PCT Filed: Oct. 18, 2017

(86) PCT No.: PCT/US2017/057212
§ 371 (c)(1),
(2) Date: Apr. 4, 2019

(87) PCT Pub. No.: WO2018/075654
PCT Pub. Date: Apr. 26, 2018

(65) Prior Publication Data
US 2019/0244597 A1    Aug. 8, 2019

Related U.S. Application Data

(60) Provisional application No. 62/411,306, filed on Oct. 21, 2016.

(51) Int. Cl.
*B32B 5/26*    (2006.01)
*B32B 5/02*    (2006.01)
(Continued)

(52) U.S. Cl.
CPC .............. *B32B 5/265* (2021.05); *B32B 5/022* (2013.01); *B32B 5/026* (2013.01); *B32B 5/26* (2013.01);
(Continued)

(58) Field of Classification Search
None
See application file for complete search history.

(56) References Cited

U.S. PATENT DOCUMENTS 4,752,300 A * 6/1988 Johnson ................. C09K 21/12
106/18.19
6,083,857 A * 7/2000 Bottger ..................... B32B 7/08
442/370
(Continued)

FOREIGN PATENT DOCUMENTS

CN    1502491 A * 6/2004
CN    2875206 Y * 3/2007
(Continued)

OTHER PUBLICATIONS

Machine Translation of JP-2001191435-A, Jul. 2001 (Year: 2001).*
(Continued)

*Primary Examiner* — Jeffrey A Vonch
(74) *Attorney, Agent, or Firm* — Meunier Carlin & Curfman LLC

(57) ABSTRACT

The present disclosure provides cover systems for covering components of a cabin interior of a vehicle, such as an automobile, a train car, a bus, a boat, or an aircraft, among others. For instance, the cover systems may cover one or more of a seat and a floor, among others, of the cabin interior. The fabric cover systems may absorb or partially absorb one or more of low-frequency sounds, such as low-frequency noise emitted by an engine, and high-frequency sounds, among others. The fabric cover systems may
(Continued)

absorb or partially absorb odor molecules. The fabric covering systems may include multiple layers. For instance, one of the layers may include activated carbon fibers. The activated carbon fibers may absorb or partially absorb one or more of sounds, liquids, and odors, among others.

20 Claims, 2 Drawing Sheets

(51) Int. Cl.

| | | |
|---|---|---|
| B60N 2/58 | (2006.01) | |
| B60N 3/04 | (2006.01) | |
| B60R 13/08 | (2006.01) | |
| G10K 11/168 | (2006.01) | |
| B64D 11/06 | (2006.01) | |
| B61D 17/10 | (2006.01) | |
| B61D 17/18 | (2006.01) | |
| B61D 33/00 | (2006.01) | |
| B63B 29/02 | (2006.01) | |
| B63B 29/04 | (2006.01) | |
| B32B 27/18 | (2006.01) | |
| B32B 27/02 | (2006.01) | |
| B32B 3/26 | (2006.01) | |
| D01F 9/14 | (2006.01) | |
| B64C 1/00 | (2006.01) | |

(52) U.S. Cl.
CPC .............. *B32B 5/279* (2021.05); *B60N 2/58* (2013.01); *B60R 13/08* (2013.01); *B60R 13/0815* (2013.01); *B61D 17/10* (2013.01); *B61D 17/185* (2013.01); *B61D 33/0035* (2013.01); *B63B 29/02* (2013.01); *B63B 29/04* (2013.01); *B64D 11/0647* (2014.12); *G10K 11/168* (2013.01); *B32B 3/26* (2013.01); *B32B 27/02* (2013.01); *B32B 27/18* (2013.01); *B32B 2250/02* (2013.01); *B32B 2250/20* (2013.01); *B32B 2262/106* (2013.01); *B32B 2305/182* (2013.01); *B32B 2305/186* (2013.01); *B32B 2305/20* (2013.01); *B32B 2307/102* (2013.01); *B32B 2307/308* (2013.01); *B32B 2307/3065* (2013.01); *B32B 2307/71* (2013.01); *B32B 2307/718* (2013.01); *B32B 2307/724* (2013.01); *B32B 2307/758* (2013.01); *B32B 2471/00* (2013.01); *B32B 2601/00* (2013.01); *B32B 2605/003* (2013.01); *B60N 3/042* (2013.01); *B60N 3/048* (2013.01); *B63B 2029/043* (2013.01); *B64C 1/00* (2013.01); *D01F 9/14* (2013.01); *D06N 2201/02* (2013.01); *D06N 2201/087* (2013.01); *D06N 2209/025* (2013.01); *D06N 2209/067* (2013.01); *D06N 2209/121* (2013.01); *D06N 2209/165* (2013.01); *D06N 2209/1678* (2013.01); *D06N 2211/14* (2013.01); *D06N 2211/261* (2013.01); *D06N 2211/263* (2013.01); *D06N 2211/267* (2013.01); *D10B 2101/12* (2013.01); *D10B 2401/10* (2013.01); *D10B 2503/00* (2013.01); *D10B 2503/04* (2013.01); *D10B 2505/08* (2013.01); *D10B 2505/12* (2013.01); *Y10S 428/921* (2013.01); *Y10T 428/24322* (2015.01); *Y10T 428/24942* (2015.01); *Y10T 428/27* (2015.01); *Y10T 428/30* (2015.01); *Y10T 442/494* (2015.04); *Y10T 442/50* (2015.04); *Y10T 442/624* (2015.04); *Y10T 442/696* (2015.04)

(56) References Cited

U.S. PATENT DOCUMENTS

| | | | |
|---|---|---|---|
| 6,633,019 B1 | 10/2003 | Gray | |
| 8,322,487 B1* | 12/2012 | Kitchen | B32B 5/022 181/294 |
| 2003/0075383 A1* | 4/2003 | Ebbitt | G10K 11/16 181/210 |
| 2003/0152742 A1* | 8/2003 | Shimizu | D06N 7/0076 428/95 |
| 2003/0199216 A1* | 10/2003 | Gomez | D04H 1/74 442/327 |
| 2004/0092188 A1* | 5/2004 | Hsieh | A41D 31/145 442/239 |
| 2004/0189061 A1* | 9/2004 | Hartwich | B60N 2/5635 297/180.14 |
| 2005/0015882 A1* | 1/2005 | Huza | A47C 31/004 5/653 |
| 2005/0159062 A1* | 7/2005 | Machino | D04H 1/48 442/320 |
| 2006/0013996 A1* | 1/2006 | Koyama | B32B 5/26 428/138 |
| 2006/0191058 A1* | 8/2006 | Huza | A41B 9/00 2/239 |
| 2007/0126274 A1* | 6/2007 | Takahashi | B60N 2/90 297/452.21 |
| 2008/0135327 A1* | 6/2008 | Matsumura | G10K 11/172 181/151 |
| 2008/0173497 A1* | 7/2008 | Kalinova | B32B 5/02 181/290 |
| 2008/0230309 A1* | 9/2008 | Fox | B32B 5/26 181/286 |
| 2009/0162610 A1* | 6/2009 | Hwang | B32B 5/26 428/151 |
| 2010/0066121 A1* | 3/2010 | Gross | D04H 1/593 296/146.5 |
| 2010/0307867 A1 | 12/2010 | Ogawa et al. | |
| 2011/0031064 A1* | 2/2011 | Law | B32B 5/245 181/294 |
| 2011/0186381 A1* | 8/2011 | Ogawa | B32B 5/26 181/294 |
| 2011/0207379 A1* | 8/2011 | Henkes | B60N 2/58 442/36 |
| 2012/0251925 A1* | 10/2012 | Sasaki | D01F 6/54 429/530 |
| 2013/0112499 A1 | 5/2013 | Kitchen et al. | |
| 2017/0200441 A1* | 7/2017 | Mohammadi Gojani | B32B 29/02 |
| 2018/0051403 A1* | 2/2018 | Kajiyama | D04H 1/593 |
| 2019/0080678 A1* | 3/2019 | Sakai | B32B 5/024 |

FOREIGN PATENT DOCUMENTS

| | | | |
|---|---|---|---|
| CN | 2889031 Y | * | 4/2007 |
| CN | 2894508 Y | * | 5/2007 |
| CN | 2910558 Y | * | 6/2007 |
| CN | 200994436 Y | * | 12/2007 |
| CN | 201020360 Y | * | 2/2008 |
| CN | 101164906 A | * | 4/2008 |
| CN | 101660254 A | * | 3/2010 |
| CN | 201419663 Y | * | 3/2010 |
| CN | 201529529 U | * | 7/2010 |
| CN | 101812782 A | * | 8/2010 |
| CN | 201557863 U | * | 8/2010 |
| CN | 101824669 A | * | 9/2010 |
| CN | 101824754 A | * | 9/2010 |
| CN | 201736850 U | * | 2/2011 |
| CN | 201816395 U | * | 5/2011 |
| CN | 102229275 A | * | 11/2011 |
| CN | 102328480 A | * | 1/2012 |
| CN | 102440663 A | * | 5/2012 |
| CN | 202265967 U | * | 6/2012 |
| CN | 102535800 A | * | 7/2012 |
| CN | 102661020 A | * | 9/2012 |
| CN | 102720322 A | * | 10/2012 |
| CN | 102973048 A | * | 3/2013 |

(56) References Cited

FOREIGN PATENT DOCUMENTS

| | | | | |
|---|---|---|---|---|
| CN | 202850418 U | * | 4/2013 | |
| CN | 103334298 A | * | 10/2013 | |
| CN | 203472220 U | * | 3/2014 | |
| CN | 103909853 A | * | 7/2014 | |
| CN | 103919398 A | * | 7/2014 | |
| CN | 203808410 U | * | 9/2014 | |
| CN | 104416965 A | * | 3/2015 | |
| CN | 104441876 A | * | 3/2015 | |
| CN | 104842843 A | * | 8/2015 | |
| CN | 105297928 A | * | 2/2016 | |
| CN | 205022082 U | | 2/2016 | |
| CN | 205890644 U | * | 1/2017 | ............ B32B 5/26 |
| DE | 102012108308 A1 | * | 9/2013 | ............ B32B 5/26 |
| GB | 2464318 A | * | 4/2010 | ............ A47C 5/00 |
| JP | 61132629 A | * | 6/1986 | |
| JP | 05214695 A | * | 8/1993 | |
| JP | 09076387 A | * | 3/1997 | |
| JP | 10095061 A | * | 4/1998 | |
| JP | 10327980 A | * | 12/1998 | |
| JP | 2001191435 A | * | 7/2001 | |
| JP | 2004217052 A | * | 8/2004 | ............ B32B 5/08 |
| JP | 2005232648 A | * | 9/2005 | ............ A47C 5/00 |
| JP | 2005348833 A | * | 12/2005 | |
| JP | 2006-195104 A | | 7/2006 | |
| JP | 2008044459 A | * | 2/2008 | |
| JP | 2009275309 A | * | 11/2009 | |
| JP | 2012240498 A | * | 12/2012 | |
| KR | 200279586 Y1 | * | 6/2002 | ............ B32B 5/08 |
| KR | 200284373 Y1 | * | 8/2002 | |
| KR | 20040016101 A | * | 2/2004 | |
| KR | 100950602 B1 | * | 4/2010 | |
| KR | 20120070858 A | * | 7/2012 | |

OTHER PUBLICATIONS

Machine Translation of CN-201020360-Y, Feb. 2008 (Year: 2008).*
Machine Translation of CN-101164906-A, Apr. 2008 (Year: 2008).*
Machine Translation of CN-101824669-A, Sep. 2010 (Year: 2010).*
Machine Translation of CN-203808410-U, Sep. 2014 (Year: 2014).*
Machine Translation of KR-20120070858-A, Jul. 2012 (Year: 2012).*
Shen et al., Analysis of sounding absorbing properties of activated carbon fiber materials, Mar. 2013, Journal of Textile Research, vol. 34, No. 3 (Year: 2013).*
Sadhan, Abstract of Chapter 24—Production of spacer fabrics in knitting, 2012, Fundamentals and Advances in Knitting Technology (Year: 2012).*
Masuelli, 2.5 Aramid-Definition, Jan. 2013, Introduction of Fibre-Reinforced Polymers—Polymers and Composites: Concepts, Properties and Processes (Year: 2013).*
Shoshani et al., Abstract for Noise absorption by woven fabrics, 1990, Applied Acoustics, vol. 30, Issue 4 (Year: 1990).*
Dias et al., Sound absorption in knitted structures for interior noise reduction in automobiles, Aug. 2006, Measurement Science and Technology, vol. 17, Issue 9 (Year: 2006).*
Dias et al., Analysis of sound absorption of tuck spacer fabrics to reduce automotive noise, Jul. 2007, Measurement Science and Technology, vol. 18 (Year: 2007).*
Dias et al., Analysis of thick spacer fabrics to reduce automobile interior noise, May 2007, Measurement Science and Technology, vol. 18 (Year: 2007).*
Chen et al., Carbonized and Activated Non-wovens as High-Performance Acoustic Materials: Part I Noise Absorption, Oct. 2007, Textile Research Journal, vol. 77, Issue 10 (Year: 2007).*
Liu et al., Sound Absorption Behavior of Knitted Spacer Fabrics, Jun. 2010, Textile Research Journal, vol. 80, Issue 18 (Year: 2010).*
Honarvar et al., Noise Absorption Modeling of Rib Knitted Fabrics, Mar. 2010, Textile Research Journal, vol. 80, Issue 14 (Year: 2010).*
Soltani et al., The analysis of acoustical characteristics and sound absorption coefficient of woven fabrics, Mar. 2012, Textile Research Journal, vol. 82, Issue 9 (Year: 2012).*
Acoustics Freq, Sound-Absorbing Drapery: Theory & Application, Jan. 2012, <https://acousticsfreq.com/sound-control-acoustic-curtain/> (Year: 2012).*
Soltani, Acoustic performance of woven fabrics in relation to structural parameters and air permeability, Sep. 2013, Journal of the Textile Institute (Year: 2013).*
Shen et al., Sound absorption properties of composite structure with activated carbon fiber felts, May 2014, Journal of the Textile Institute, vol. 105, Issue 10 (Year: 2014).*
Shen et al., Effects of different parameters on acoustic properties of activated carbon fiber felts, Apr. 2014, Journal of the Textile Institute, vol. 105, Issue 4 (Year: 2014).*
Sancak, An Investigation of Sound Absorbance Properties of Weft Knitted Spacer Fabrics, 2015, International Journal of Acoustics and Vibration, vol. 20, No. 1, (Year: 2015).*
Pieren et al., Predicting sound absorption coefficients of lightweight multilayer curtains using the equivalent circuit method, May 2015, Applied Acoustics, vol. 92 (Year: 2015).*
Shen et al., The influence of production parameters on sound absorption of activated carbon fiber felts, Oct. 2015, Journal of the Textile Institute, vol. 107, Issue 9 (Year: 2015).*
Shen et al., Sound absorptive properties of activated carbon fibers, 2017, Activated Carbon Fiber and Textiles (Year: 2017).*
International Preliminary Report on Patentability for PCT Patent Application No. PCT/US2017/057212, dated May 2, 2019; 12 pages.
N. Jiang et al., "Accoustical evaluation of carbonized and activated cotton nonwovens", Bioresource Technology 100 (2009) 6533-6536. Aug. 6, 2009. Retrieved Dec. 7, 2017. https://pdfs.semanticscholar.org/57ee/62aaeb9e2fe6dd2482c9563653923b3cee62.pdf>entire document.
International Search Report and Written Opinion of International application No. PCT/US2017/057212 filed Oct. 18, 2017. dated Jan. 4, 2018, 13 pages.

* cited by examiner

NOISE-ABSORBENT AND ODOR-ADSORBENT FABRIC COVER SYSTEMS FOR VEHICLE INTERIORS

RELATED APPLICATIONS

This application is a U.S. National Stage Application of International Application No. PCT/US2017/057212 filed Oct. 18, 2017, which designates the United States, and claims priority to U.S. Provisional Application No. 62/411,306 filed Oct. 21, 2016; the contents of which are incorporated herein by reference in their entirety.

TECHNICAL FIELD

This disclosure relates to noise absorbent and odor adsorbent fabrics, and more specifically, to fabric cover systems that are noise absorbent and odor adsorbent, for use in cabin interiors of vehicles.

BACKGROUND

The interior cabin of a vehicle, such as an aircraft, includes a floor, seats for passengers, and panels for storage and insulation. The cabin floor and each seat are often covered in a carpet-like fabric. Such coverings are subject to physical wear and tear from, for example, spilled liquids, food, bodily fluids, and passenger and luggage traffic. Floor and seat coverings can be periodically wiped down or vacuumed. However, these coverings are not easily removed, collected, and transported for thorough cleaning or replacement, and as a result, may develop an unpleasant odor caused by odor molecules. In addition, the interior of a vehicle often has odors not emanating from the seat and floor as well as various noises, all of which make the travel experience less pleasant.

SUMMARY

The present disclosure provides a cover system that may absorb or partially absorb one or more of sounds, liquids, and odors, among others. The cover system may be utilized on or with one or more components of an interior cabin of a vehicle. In one instance, the vehicle may be or include an automobile, a train car, a bus, a boat, or an aircraft, among others. In a second instance, the one or more components of the interior cabin of the vehicle may include one or more of a seat and a floor, among others. In another instance, the cover system may be utilized to cover the one or more of the seat and the floor, among others.

The cover system may include multiple layers. For instance, the system may include a first layer and a second layer, among others. The first lay may be or include a porous surface layer. The second layer may be or include an inner layer. For instance, the second layer may include activated carbon fibers. The activated carbon fibers may absorb or partially absorb one or more of sounds, liquids, and odors, among others. For instance, the activated carbon fibers may have or be associated with a noise absorption coefficient greater than or equal to 0.55 and less than or equal to 0.95 within a sound frequency range of 500-1700 Hz. The second layer may at least partially absorb sound waves within the sound frequency range of 500-1700 Hz, among others. Low-frequency sound waves may include the sound frequency range of 500-1700 Hz, among others. The second layer may include activated carbon fibers with a micropore volume greater than or equal to 0.2 and less than or equal to 1.5 $cm^3/g$. The second layer may include activated carbon fibers with a weight between 40-400 $g/m^2$ and a thickness between 3-10 mm. The second layer may be or include nonwoven felt that includes activated carbon fibers. In one instance, the felt may have a weight between 40-400 $g/m^2$. In another instance, the felt may have and a thickness between 3-10 mm. The second layer may have or be associated with a noise absorption coefficient greater than or equal to 0.55 and less than or equal to 0.95 within a sound frequency range of 1000-1400 Hz. For instance, the felt that includes activated carbon fibers may have or be associated with a noise absorption coefficient greater than or equal to 0.55 and less than or equal to 0.95 within a sound frequency range of 1000-1400 Hz.

The first layer may have or associated with a noise absorption coefficient of 0.92 or greater within a sound frequency range of 1700-4000 Hz. In one instance, first layer may at least partially absorb sound waves within the sound frequency range of 1700-4000 Hz. In another instance, the first layer may be sufficiently porous to at least partially absorb sound waves within the sound frequency range of 1700-4000 Hz, among others. The first layer may be or include a weft knitted fabric. The first layer may be one or more of flame resistant, thermally stable, and ultraviolet light resistant, among others. The first layer may permit sound waves within the sound frequency range of 500-1700 Hz to at least partially pass through. For instance, permitting the sounds waves to pass through the first layer, the sound waves may be absorbed or at least partially absorbed by the second layer. The first layer may include a design. For instance, the design may be decorative.

BRIEF DESCRIPTION OF THE DRAWINGS

For a more complete understanding of the present disclosure and its features and advantages, reference is now made to the following description, taken in conjunction with the accompanying drawings, which are not to scale, in which like numerals refer to like features, and in which.

DETAILED DESCRIPTION

The present disclosure provides fabric cover systems for one or more components of a vehicle's interior cabin. For instance, the vehicle may be an automobile, a train car, a bus, a boat, or an aircraft, among others. The disclosed fabric cover systems may be noise absorbent and odor adsorbent. Such fabric cover systems may include activated carbon fibers (ACF), which are a particular type of carbon fibers that are made of carbon processed to have many nano-scale, low-volume pores that increase the surface area available for one or more of odor adsorption, liquid absorption, and noise absorption, among others. The fabric cover systems may be particularly well-suited for use in an aircraft interior cabin.

A seat and floor fabric cover system may include a multi-layer structure. For instance, the seat and floor fabric cover systems may have a two-layer structure, which may include a surface layer and an inner layer made of ACF. The inner layer may absorb low-frequency sound waves. In one instance, the low-frequency sound waves may be in a range of 500-1700 Hz. In a second instance, the inner layer may have or be associated with a noise absorption coefficient greater than or equal to 0.55 and less than or equal to 0.95.

In another instance, the inner layer may have or be associated with a noise absorption coefficient greater than or equal to 0.55 and less than or equal to 0.95 within a sound frequency range of 500-1700 Hz. The inner layer may adsorb odor molecules via its ACF. For instance, the ACF may have a micropore volume greater than or equal to 0.2 and less than or equal to 1.5 $cm^3/g$. The micropore volume may facilitate odor adsorption.

Figure 1:
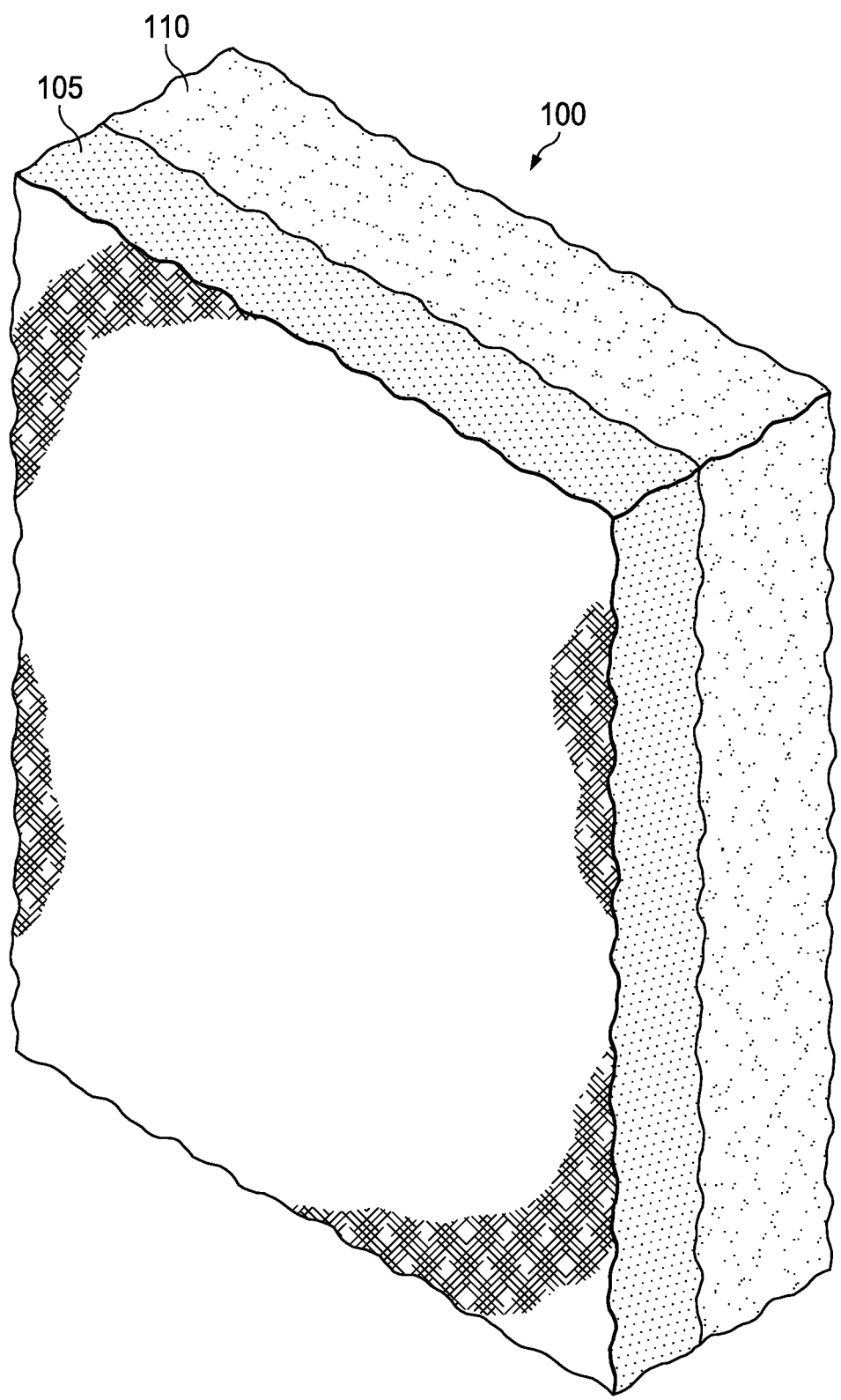
FIG. 1 is a schematic representation of an example fabric cover system for a seat of a vehicle.
Figure 2:
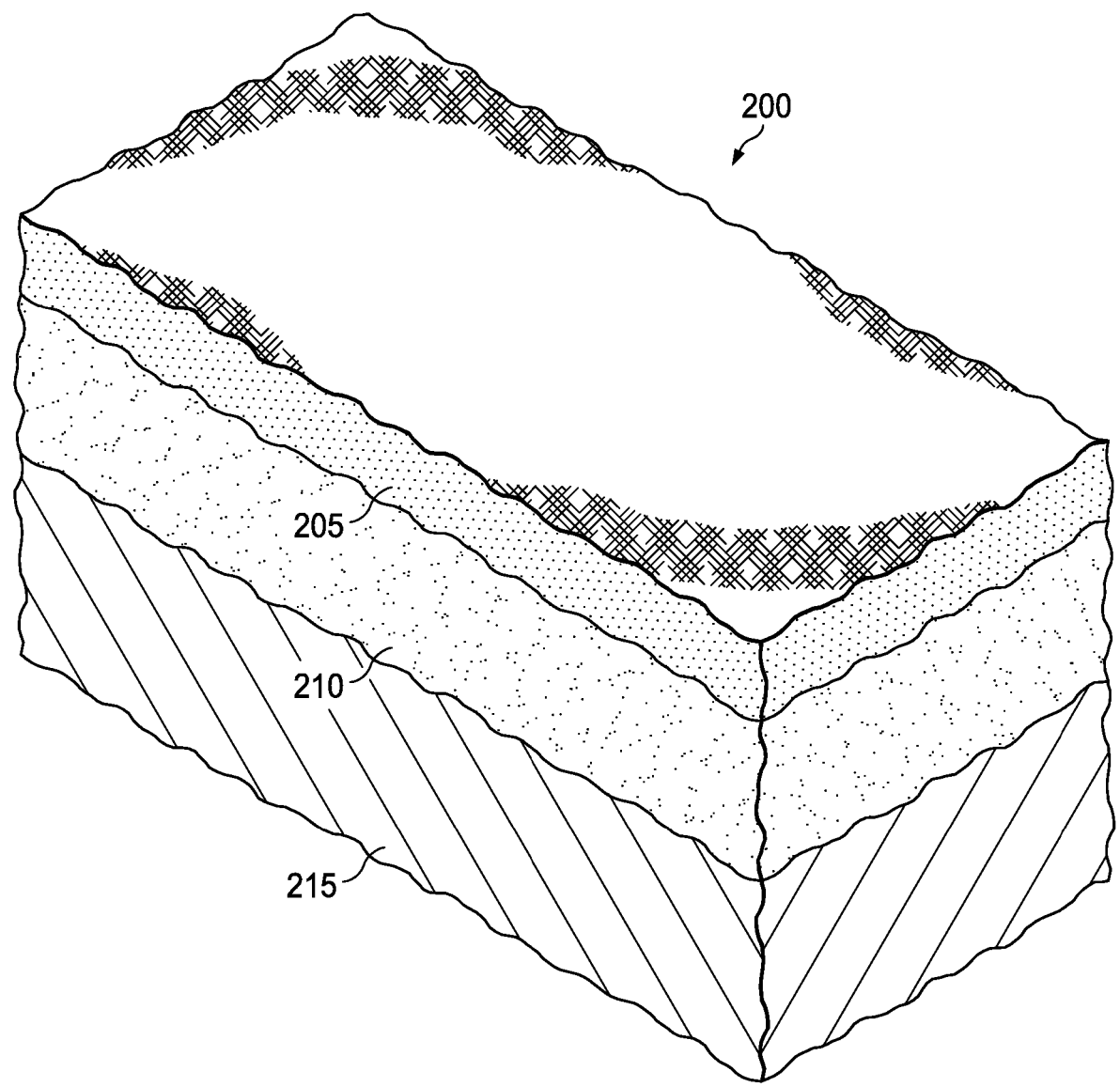
FIG. 2 is a schematic representation of an example fabric cover system for a floor of a vehicle.

Referring now to the drawings, FIG. 1 illustrates a schematic representation of an example fabric cover system 100 for a seat of a vehicle. As shown, fabric cover system 100 provides a multi-layer structure. In one instance, fabric cover system 100 may include a two-layer structure, which may include a surface layer 105 and an inner layer 110. In another instance, fabric cover system 100 may include a first layer (e.g., layer 105) that covers a second layer (e.g., layer 110). FIG. 2 illustrates a schematic representation of an example fabric cover system 200 for a floor of a vehicle. As shown, fabric cover system 200 provides a multi-layer structure. In one instance, fabric system 200 may include a two-layer structure, which may include a surface layer 205 and an inner layer 210. As illustrated, fabric cover system 200 may rest and/or be placed on a cabin floor 215. For instance, fabric cover system 200 may be placed and/or affixed on a cabin floor 215 via one or more fasteners and/or one or more adhesives.

Each of layers 110 and 210 may be or include a nonwoven felt made of ACF. For instance, the nonwoven felt made of ACF may absorb low-frequency sound waves. The low-frequency sound waves may have a sound frequency range of 500-1700 Hz. For instance, the nonwoven felt made of ACF may have or may be associated with a noise absorption coefficient greater than or equal to 0.55 and less than or equal to 0.95 within a sound frequency rang of 500-1700 Hz. Such sounds with the sound frequency rang of 500-1700 Hz may be generated by an engine. For instance, a low frequency sounds generated by an aircraft's engine, typically around 1200 Hz, may be absorbed or partially absorbed by the nonwoven felt made of ACF. Layers 105 and 205 may provide wear and/or tear protection of respective layers 110 and 210.

Inner layers 110 and 210 may absorb at least low-frequency sound waves in the range of 1000-1400 Hz with a noise absorption coefficient greater than or equal to 0.55 and less than or equal to 0.95. Inner layers 110 and 210 may absorb at least low-frequency sound waves in the range of 1000-1400 Hz with a noise absorption coefficient of 0.85 or greater. Inner layers 110 and 210 may be soft to the touch in a manner similar to foam. Inner layers 110 and 210 may adsorb at least some odor molecules and/or at least some liquids that may contact with one or more of inner layers 110 and 210. For instance, an interior of a cabin may be quieter and/or fresher, utilizing one or more of inner layers 110 and 210.

ACF may have high surface areas usually in the range of 1000-2400 $m^2/g$. ACF may be produced by partial gasification of carbon in steam or other oxidizing gases. ACF may have many pores per unit mass. For example, polyacrylonitrile (PAN), rayon, and phenol-based ACFs typically may have a pore volume in the range of 0.1-1.0 $cm^3/g$. ACF may have an average pore size of approximately 10-20 Å.

ACF may control odors by adsorbing odor molecules. One or more of ACF micropore volume, micropore width, micropore diameter, and surface area, among others, may determine efficiency of the odor adsorption. ACF may control and/or mitigate noise in a sound frequency range of 500-1700 Hz, which is a typical range at which an aircraft's engine produces low frequency noise. For instance, with a noise absorption coefficient in the range of 0.55-0.95, ACF may control and/or mitigate noise in a sound frequency range of 500-1700 Hz. ACF may control and/or mitigate noise in a sound frequency range of 500-1700 Hz based at least on one or more of an ACF surface area, an AFC pore volume, an AFC pore size and distribution, and an ACF nonwoven structure, among others. ACF may be incorporated into composites. For instance, ACF may be incorporated into composites, such as woven and nonwoven fabrics, felt, and paper, among others. ACF felts may be textiles produced by one or more of matting, condensing, and pressing ACF together, among others. In one instance, an ACF felt weight may be in a range of 40-400 $g/m^2$. In another instance, an ACF felt thickness may be within 3-10 mm.

In seat fabric cover system 100, surface layer 105 may be a porous layer that allows normal incident low-frequency sound waves, particularly those in a sound frequency range of 500-1700 Hz, to pass through. For instance, allowing and/or permitting sound waves (e.g., sound waves in a sound frequency range of 500-1700 Hz) may allow and/or permit the sound waves to be absorbed or partially absorbed by the ACF of inner layer 110. Surface layer 105 may be sufficiently porous to absorb high-frequency sound waves. For instance, the high-frequency sound waves may be in a sound range of 1700-4000 Hz. Surface layer 105 may have or be associated with a noise absorption coefficient of 0.92 or greater in a sound frequency range of 1700-4000 Hz.

Surface layer 105 may be made of synthetic fibers. For instance, the synthetic fibers may provide one or more of flame resistance (e.g., flame resistance for fire prevention or fire mitigation), thermal stability (e.g., thermal stability for retention of wear-performance and dimension at high temperature), and ultraviolet (UV) light resistance (e.g., UV light resistance for retention of strength and elasticity). Examples of synthetic fibers may include basophil, polypropylene, polyester, and nylon, among others. The synthetic fibers may demonstrate flame resistance, for instance, by having a limiting oxygen index (LOI)≥32. The synthetic fibers may demonstrate thermal stability, for instance, by having hot air shrinkage of <1%, at 200° C. for one hour. The synthetic fiber may demonstrate UV light resistance, for instance, by showing minimal or no strength loss after being subject to two hundred hours in a xenon arc test chamber. Surface layer 105 may be a weft knitted fabric, with fabric weight 200 $g/m^2$ and fabric thickness 1 mm. Surface layer 105 may provide sufficient extensibility to create a three-dimensional seat shape. Although fabric weight and air permeability of a surface layer may be important properties associated with odor transport, a particular surface layer may be selected by performing one or more physical tests. For instance, the one or more tests may examine and/or determine one or more of colorfastness, abrasion, pilling, tear strength, tensile strength, bursting strength, and compression, among others.

Seat surface fabrics (often called seat décor fabric) and floor surface fabrics (often called floor décor fabric) may be different. For instance, seat surface fabrics may be knitted fabrics, whereas floor surface fabrics may be pile fabrics. As used herein, "pile" may refer to pile fabric as described in the following paragraph, and may not be used to indicate a density of fibers, height of fibers, or any other specific characteristic.

A pile fabric (e.g., woven, knitted, etc.) may have multiple components. For instance, a pile fabric may have two components: a base layer (e.g., a porous structure) and a pile surface layer. A porous base layer and a pile surface layer of a pile fabric may be two different things. A non-pile fabric, in contrast, may lack a two component structure.

Seat surface fabrics may be artificial leather or woven fabrics, for instance, pile or non-pile woven fabrics. Seat surface fabrics may be weft or warp knitted fabrics that may be pile or non-pile fabrics. For instance, a seat surface fabric (such as surface layer 105) may be a weft or warp knitted fabric, which may include only a porous base structure (e.g., a non-pile knitted fabric) or both a porous base structure and a pile surface layer (e.g., a pile knitted fabric).

Floor surface fabrics, in contrast, may be or may include pile fabrics. For instance, floor surface fabrics may be or may include non-woven velour or pile woven fabrics with a coated back. Floor surface fabrics (e.g., surface layer 205) may have a two component structure of pile fabrics, as described.

In floor fabric cover system 200, surface layer 205 may be or may include a porous outer layer that allows normal incident low-frequency sound waves (e.g., sound waves in a 500-1700 Hz range) to pass through and be absorbed or partially absorbed by the ACF of inner layer 210. In one instance, surface layer 205 may be or may include a warp knitted pile fabric with fabric weight 250 g/m$^2$ and fabric thickness 2 mm. In another instance, surface layer 205 may further be sufficiently porous to absorb or partially absorb high-frequency sound waves in a sound frequency range of 1700-4000 Hz with a noise absorption coefficient of 0.92 or greater. Surface layer 205 may have or may include one or more designs and/or one or more decorations. A surface layer for a floor cover system may be selected by performing physical one or more tests. For instance, the one or more tests may examine and/or determine one or more of colorfastness, abrasion, pilling, tear strength, tensile strength, bursting strength, compression, and stain removal, among others.

During operation, aircraft engines may generate low-frequency sounds. For instance, low-frequency sounds generated by the aircraft engines may typically have or may include a frequency around 1200 Hz. For instance, an interior cabin noise level may be reduced by interior panels and/or insulating layers. Due to practical concerns in the construction of aircrafts, cabin interior design may prioritize cabin space, lightweight materials, and passenger safety, among others, which may limit an addition of supplemental noise absorption and/or odor adsorption devices and/or materials. One or more of the disclosed fabric cover systems may provide one or more of noise absorption, odor adsorption, flame resistance, and UV light resistance, among others, while being lightweight and/or minimizing an increase of cabin space in an aircraft.

Fabric cover systems may be similarly employed in other vehicles, particularly those with engines or other equipment that also generate low-frequency sounds around 1200 Hz, or between 500 Hz and 1700 Hz.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A fabric cover system, comprising:
a first layer comprising a surface fabric; and
a second layer comprising a felt that includes activated carbon fibers (ACF),
wherein the felt has a weight between 40-400 g/m$^2$ and a thickness between 3-10 mm;
wherein the second layer has a noise absorption coefficient greater than or equal to 0.55 and less than or equal to 0.95 within a sound frequency range of 500-1700 Hz; and
wherein the first layer covers the second layer and is sufficiently porous to allow sound waves within the sound frequency range of 500-1700 Hz to pass through to be absorbed by the second layer and has a noise absorption coefficient of 0.92 or greater within a sound frequency range of 1700-4000 Hz.

2. The fabric cover system of claim 1, wherein the second layer has a noise absorption coefficient greater than 0.85 and less than or equal to 0.95 within a sound frequency range of 1000-1400 Hz.

3. The fabric cover system of claim 1, wherein the activated carbon fibers have a surface area in the range of 1000-2400 m$^2$/g.

4. The fabric cover system of claim 1, wherein the activated carbon fibers have a micropore volume greater than or equal to 0.2 and less than or equal to 1.5 cm$^3$/g.

5. The fabric cover system of claim 1, wherein the activated carbon fibers are polyacrylonitrile (PAN), rayon, or phenol-based, have a micropore volume in the range of 0.1-1.0 cm$^3$/g, and an average pore size of 10-20 Å.

6. The fabric cover system of claim 1, wherein the second layer at least partially adsorbs odor molecules.

7. The fabric cover system of claim 6, wherein the activated carbon fibers at least partially absorb the odor molecules.

8. The fabric cover system of claim 1, wherein the first layer comprises one or more designs and/or one or more decorations.

9. The fabric cover system of claim 1, wherein the surface fabric is a pile fabric, a non-woven velour, an artificial leather, a woven fabric, or weft or warp knitted fabric.

10. The fabric cover system of claim 9, wherein the surface fabric is a warp or weft knitted fabric.

11. The fabric cover system of claim 10, wherein surface fabric is a weft knitted fabric having a weight of 200 g/m$^2$ and a fabric thickness of 1 mm.

12. The fabric cover system of claim 10, wherein surface fabric is a warp knitted pile fabric having a weight of 250 g/m$^2$ and a fabric thickness of 2 mm.

13. The fabric cover system of claim 1, wherein the first layer comprises synthetic fibers, wherein the synthetic fibers provide one or more of flame resistance, thermally stability, and ultraviolet (UV) light resistance.

14. The fabric cover system of claim 13, wherein the synthetic fibers provide flame resistance by having a limiting oxygen index (LOI) greater than or equal to 32, provide thermal stability by having hot air shrinkage of less than 1% at 200° C. for one hour, and/or provide UV light resistance by showing minimal or no strength loss after being subject to two hundred hours in a xenon arc test chamber.

15. The fabric cover system of claim 1, wherein the cover system covers a seat.

16. The fabric cover system of claim 15, wherein the seat is a seat of a vehicle.

17. The fabric cover system of claim 16, wherein the vehicle is an automobile, a train car, a bus, a boat, or an aircraft.

18. The fabric cover system of claim 1, wherein the cover system covers a floor.

19. The fabric cover system of claim 18, wherein the floor is a floor of a vehicle.

20. The fabric cover system of claim 19, wherein the vehicle is an automobile, a train car, a bus, a boat, or an aircraft.

\* \* \* \* \*